(12) United States Patent
Moisey et al.

(10) Patent No.: US 7,043,001 B2
(45) Date of Patent: May 9, 2006

(54) METHODS AND SYSTEMS FOR DETECTING AND MITIGATING CALL ROUTING ARBITRAGE IN A TELECOMMUNICATIONS NETWORK

(75) Inventors: Kenneth Andrew Moisey, Raleigh, NC (US); Peter Joseph Marsico, Chapel Hill, NC (US)

(73) Assignee: Tekelec, Calabasas, CA (US)

( * ) Notice: Subject to any disclaimer, the term of this patent is extended or adjusted under 35 U.S.C. 154(b) by 167 days.

(21) Appl. No.: 10/686,827

(22) Filed: Oct. 16, 2003

(65) Prior Publication Data
US 2005/0084090 A1 Apr. 21, 2005

(51) Int. Cl.
*H04M 7/00* (2006.01)
(52) U.S. Cl. .................. 379/221.14; 379/145; 379/189
(58) Field of Classification Search ................ 379/145, 379/189, 219, 220.01, 221.08, 221.13, 221.14, 379/229, 230
See application file for complete search history.

(56) References Cited

U.S. PATENT DOCUMENTS

| | | | | |
|---|---|---|---|---|
| 5,463,681 A | * | 10/1995 | Vaios et al. ................. | 379/189 |
| 5,805,686 A | * | 9/1998 | Moller et al. ............... | 379/198 |
| 5,995,604 A | * | 11/1999 | Chan et al. ................. | 379/145 |
| 6,307,926 B1 | * | 10/2001 | Barton et al. ............... | 379/189 |
| 6,519,331 B1 | * | 2/2003 | Stevens et al. ............. | 379/145 |
| 6,590,967 B1 | * | 7/2003 | Marchand et al. ..... | 379/114.14 |
| 6,633,633 B1 | | 10/2003 | Bedingfield | |
| 6,633,755 B1 | | 10/2003 | Haumont | |
| 6,636,592 B1 | | 10/2003 | Marchand et al. | |

OTHER PUBLICATIONS

Engebretson, "ANALYSIS: How Alleged MCI Fraud May Have Worked," America's Network, http://www.americasnetwork.com/americasnetwork/article/articleDetail.jsp?id=65236, p. 1-3 (Aug. 1, 2003).

Guerra, "Carriers Cheating Other Carriers," Billing World and OSS Today Magazine, wysiwyg://4/http://www.billingworld.com/archive-detail.cfm?archiveID=6706, p. 1-7, (Aug. 2003).

* cited by examiner

*Primary Examiner*—Bing Q. Bui
(74) *Attorney, Agent, or Firm*—Jenkins, Wilson, Taylor & Hunt, P.A.

(57) ABSTRACT

Methods and systems for detecting and mitigating call routing arbitrage in a telecommunications network are disclosed. A network routing node, such as a signaling gateway (SG), intercepts call setup signaling messages. An arbitrage detector/processor examines parameters contained in an intercepted message to identify the presence of call routing arbitrage. For messages that indicate the presence of call routing arbitrage, the arbitrage detector/processor may perform a mitigating action, including redirecting the call to an interactive voice response (IVR) node, blocking the call, and/or inserting missing information in the call setup message and completing the call.

45 Claims, 14 Drawing Sheets

METHODS AND SYSTEMS FOR DETECTING AND MITIGATING CALL ROUTING ARBITRAGE IN A TELECOMMUNICATIONS NETWORK

TECHNICAL FIELD

The present invention relates to methods and systems for detecting and mitigating call routing arbitrage in a telecommunications network. More particularly, the present invention relates to methods and systems for detecting call signaling messages that have been routed and, in some cases, modified so as to cause a call to be routed in an erroneous or fraudulent manner.

BACKGROUND ART

In today's highly regulated telecommunications environment, network usage billing is governed by a complex set of rules and local access and transport area (LATA) tariffs. In order to properly abide by these rules and tariffs, calls are normally routed over trunk groups that have been designated and configured to carry the particular call types. Examples of calls that have different tariffs include local calls, interLATA-interstate calls, interLATA-intrastate calls, intraLATA-interstate calls, intraLATA-intrastate calls, etc. In practice, this complex tariff structure coupled with a large number of service providers and an associated array of complex interconnection agreements provides ample opportunity and incentive for calls to be inappropriately routed to their destinations. While such inappropriately routed calls may be the result of unintentional, erroneous routing translations in the network, all too often, such call routing is the result of a service provider trying to take advantage of the complex tariff structure by exploiting the call routing limitations of current telecommunication networks.

For example, switches in the public switched telephone network (PSTN) route calls based solely on the called party number that is contained within the call setup messages exchanged between switches. In other words, network switching elements make no attempt at determining the call type (e.g., local, interLATA-interstate, etc.). Hence, it is entirely possible for a network operator, intentionally or otherwise, to route any call type over any inter-switch trunk group.

It is possible, for instance, that calls which are non-local in nature may be routed over local trunk groups, thereby avoiding LATA access charges. An example of such a call scenario is depicted in FIG. 1. In FIG. 1, an exemplary telecommunication network 100 includes a core PSTN network 102, a tandem switching office 104 owned by Service Provider B, an end office 106 owned by Service Provider A, and a tandem switching office 108 owned by Service Provider C. An access trunk group 110 connects tandem switching office 104 and end office 106, while a local trunk group 112 connects tandem offices 104 and 108, and a local trunk group 114 connects tandem office 108 and end office 106. Network 100 also includes a calling party 116, and a called party 118, where the called party 118 is served by end office 106.

For purposes of illustration, it is assumed that a call placed from calling party 116 to called party 118 is not a local call, and consequently should be subject to inter-LATA tariff charges. Accordingly, a call from calling party 116 to called party 118 should be routed from Service Provider B's tandem office 104 to the terminating end office 106 of Service Provider A via the access bearer trunk group 110 that has been designated to carry non-local call traffic. However, as indicated in FIG. 1, Service Provider B may intentionally or otherwise route the non-local call to called party 118 via tandem office 108 over local bearer trunk groups 112 and 114. As such, a non-local call may be completed between calling party 116 and called party 118 without using the access trunk(s) that have been designated to handle such non-local traffic by Service Provider A.

In cases where such misrouting is performed intentionally for financial gain, the service provider perpetrating the fraud may modify one or more fields in a call setup signaling message, such as a signaling system 7 (SS7) ISDN user part (ISUP) initial address message (IAM), so as to make the fraudulent routing difficult to detect. FIG. 2 illustrates an ISUP IAM message 130, which includes a calling party number (CgPN) parameter 132, a called party number (CdPN) parameter 134, and a jurisdiction information parameter (JIP) 136, and a carrier identification code (CIDC) parameter 138. One or more of these parameters may be modified in order to misroute a call and to hide the fact that fraudulent routing has occurred. For example, the JIP and/or calling party number parameters may be hidden or erased to prevent source identification for source-based billing.

FIG. 3 is another view of network 100 that includes both bearer and signaling trunks. More particularly, signaling trunk 120 connects switches 104 and 108, signaling trunk 122 connects switches 106 and 108, and signaling trunk 124 connects switches 104 and 106. In an SS7 network, IAM call setup messages are used by switches to select bearer trunks (e.g., bearer trunks 110, 112, 114) and determine how a call will be routed within the network. In the sample call scenario depicted in FIGS. 1 and 2, if Service Provider B intends to route a call via local trunks 112 and 114, IAM signaling messages are communicated from Service Provider B's tandem office 104 to Service Provider C's tandem office 108 via signaling trunk 120 and eventually to the terminating end office 106 via signaling trunk 122. As described above, inter-carrier billing is often based on call origination information (e.g., calling party number, JIP parameter, etc.) Consequently, before misdirecting a call setup IAM message (as shown in FIG. 2) and enabling the call to be completed without using the appropriate access trunk group 110, Service Provider B's tandem office 104 may erase or alter a JIP or calling party number parameter contained in the call setup message. These parameters may be modified by Service Provider B in such a manner that it is not possible to determine the origin of the call, and, consequently, it is not possible for Service Provider A to determine that misrouting has occurred and/or the type of tariff to apply to the call.

The financial implications of such fraudulent routing may be substantial to a network operator. A typical routing arrangement associated with the network environment illustrated in FIG. 1 might require Service Provider B to pay Service Provider A terminating access charges in the range of $0.01 to $0.03 per minute for the call from calling party 116 to called party 118. Whereas, in the case where an inter-LATA call is routed over local trunk groups, Service Provider B may only be required to pay a fraction of this per minute charge to Service Provider A, if anything at all. The case where a call is intentionally misrouted to avoid tariffs is referred to as "arbitrage." However, the term "arbitrage," as used herein, is intended to include both the intentional and non-intentional misrouting of calls.

Accordingly, there exists a long felt need for improved methods and systems for detecting, mitigating and preventing fraudulent or otherwise misrouted calls in a telecommunications network.

DISCLOSURE OF INVENTION

The present invention includes methods and systems for detecting, mitigating and preventing the intentional or unintentional misrouting of calls in a telecommunications network. In one exemplary implementation, the present invention includes a network routing node, such as a signaling system 7 (SS7) signal transfer point (STP) or an Internet protocol (IP) capable signaling gateway (SG), which is adapted to intercept and examine call setup signaling messages. More particularly, an arbitrage detector/processor associated with the routing node may examine parameters contained in an intercepted message and determine whether the message has been misrouted. If examined parameters in the message have been modified, erased, or otherwise contain insufficient information to determine whether the message has been misrouted, the arbitrage detector/processor may reconstruct the modified message by obtaining the missing or modified information. The arbitrage detector/processor may also perform an arbitrage mitigation action. Arbitrage mitigation actions may include redirecting the call to an interactive voice response (IVR) node collects the required information from the calling party. Once the necessary information is obtained and appropriate call routing can be confirmed, the call is completed to the called party. If a call is determined to be inappropriately routed, the IVR may inform the calling party of the problem and/or drop the call. The arbitrage detector/processor may also generate a usage measurements and billing report that documents inappropriately routed and/or suspiciously routed call statistics.

An example of arbitrage that the present invention is intended to mitigate may include an IXC sending interstate traffic wants a connection to a terminating LEC but doesn't want to pay that LEC's tariff rates. The IXC can negotiate a contract with an RBOC that allows the IXC to direct all its traffic to the RBOC, which then sends it on to the LEC. The RBOC and the LEC have a bill-and-keep arrangement rather than an access fee. So the IXC pays the RBOC a fee but avoids the higher tariff set by the LEC. Meanwhile, the RBOC gets to make a bundle from handling traffic it might not otherwise get. The RBOC may hide data to prevent the LEC from identifying that the bypass is occurring. For example, the RBOC may change parameter values in signaling messages to masquerade long distance as local traffic to take advantage of bill-and-keep arrangements. The agreement between the RBOC and the long distance company is a formal agreement; there's nothing hidden about it, except which calls are coming from the IXC. In order to avoid this type of arbitrage, the LEC has to identify incoming traffic. However, if the RBOC strips out the calling ID number (also known as the ANI) and other pertinent IXC information such as the CIC and jurisdictional information, without the present invention, arbitrage cannot be identified.

Accordingly, it is an object of the invention to provide methods and systems for detecting and mitigating fraudulently or otherwise misrouted calls in a communications network.

It is another object of the invention to provide methods and systems for reconstructing a call signaling message that has been altered in an attempt to fraudulently route a call.

It is another object of the invention to provide methods and systems for generating and reporting information associated with suspiciously routed or misrouted calls in a communications network.

Some of the objects of the invention having been stated hereinabove, and which are addressed in whole or in part by the present invention, other objects will become evident as the description proceeds when taken in connection with the accompanying drawings as best described hereinbelow.

BRIEF DESCRIPTION OF THE DRAWINGS

Preferred embodiments of the invention will now be described with reference to the accompanying drawings of which.

DETAILED DESCRIPTION OF THE INVENTION

Figure 1:
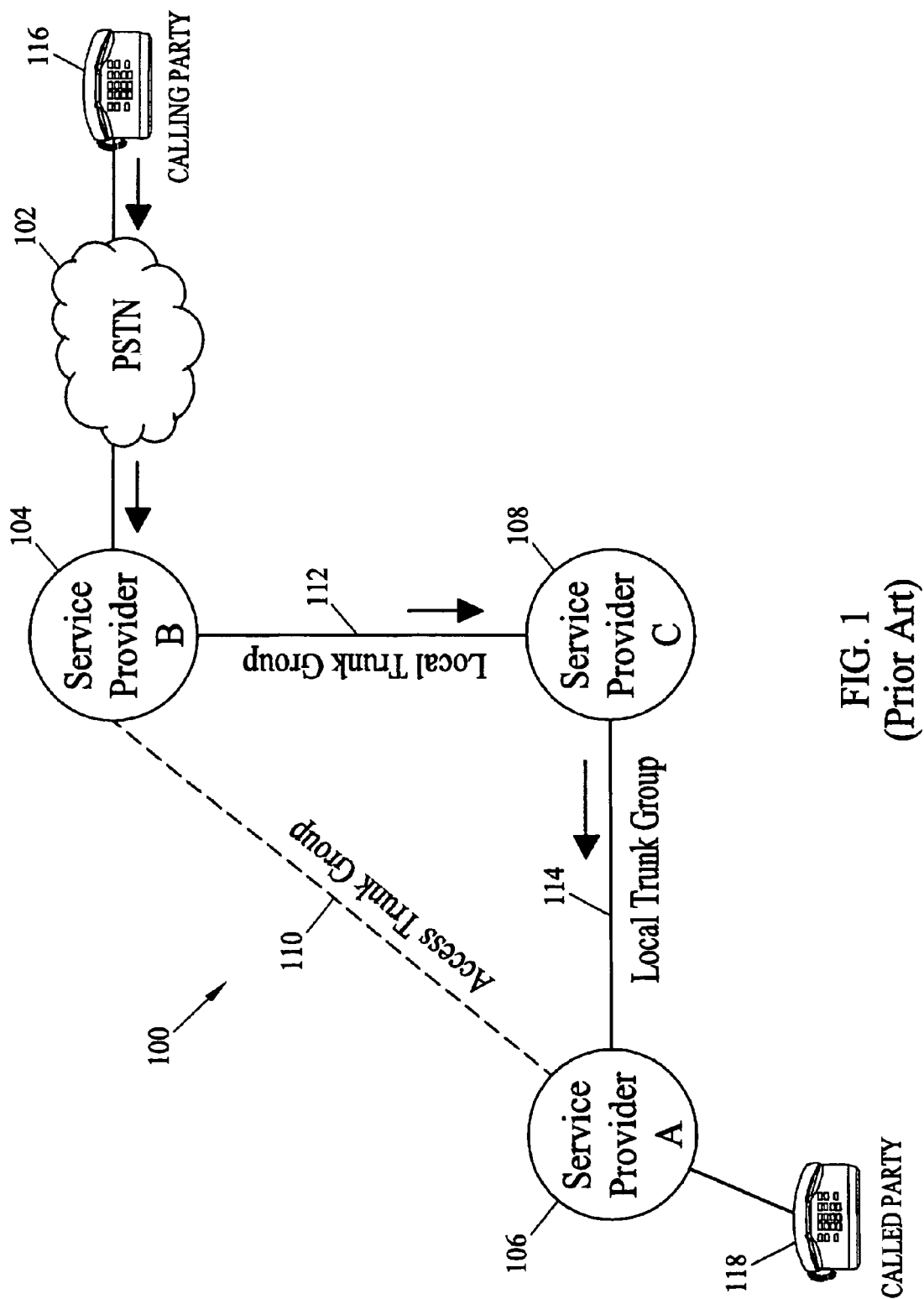
FIG. 1 is a network diagram illustrating an arbitrage call routing scenario in a telecommunications network.
Figure 2:
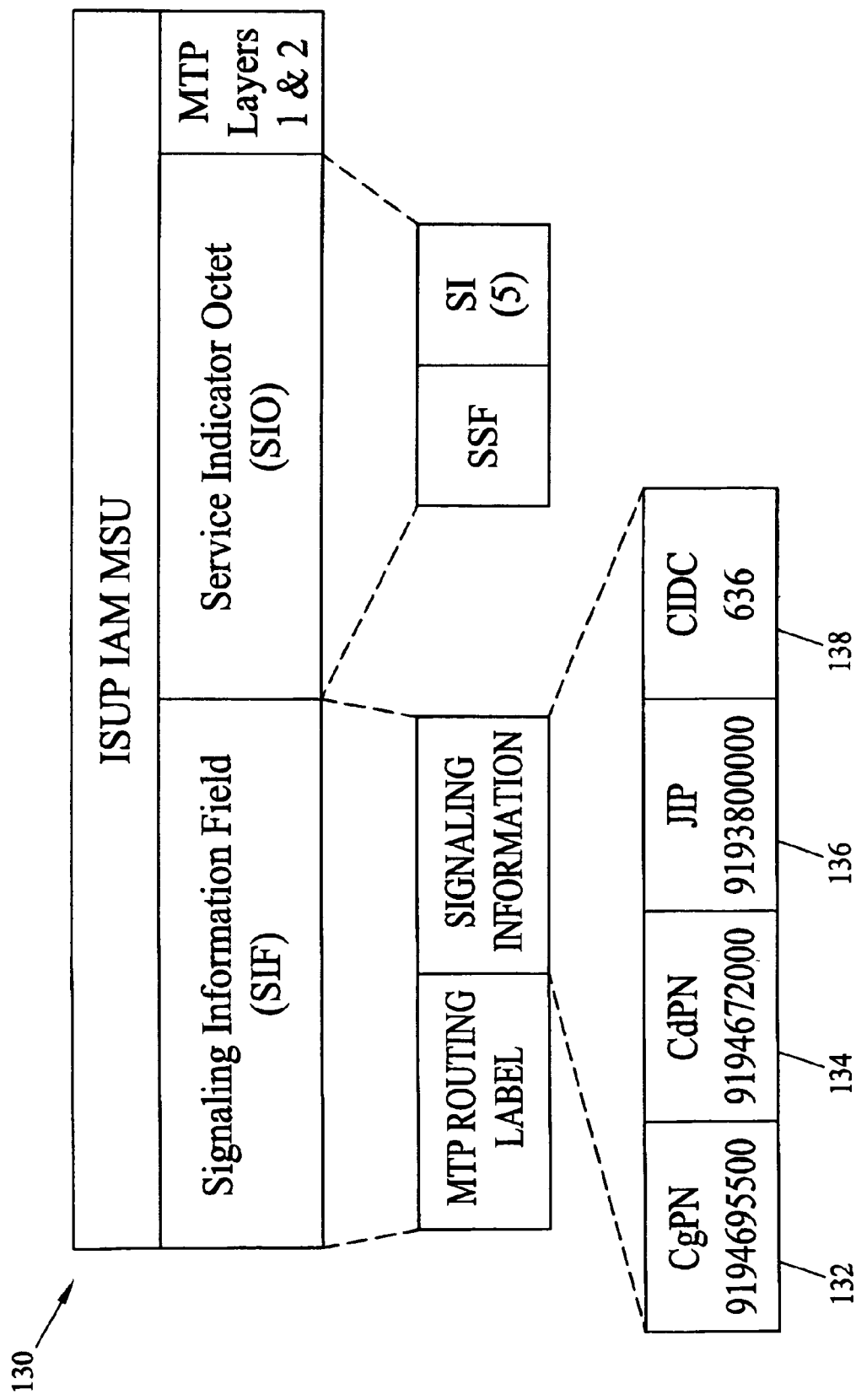
FIG. 2 is a block diagram illustrating a signaling system 7 ISDN user part (ISUP) Initial Address Message (IAM)
Figure 3:
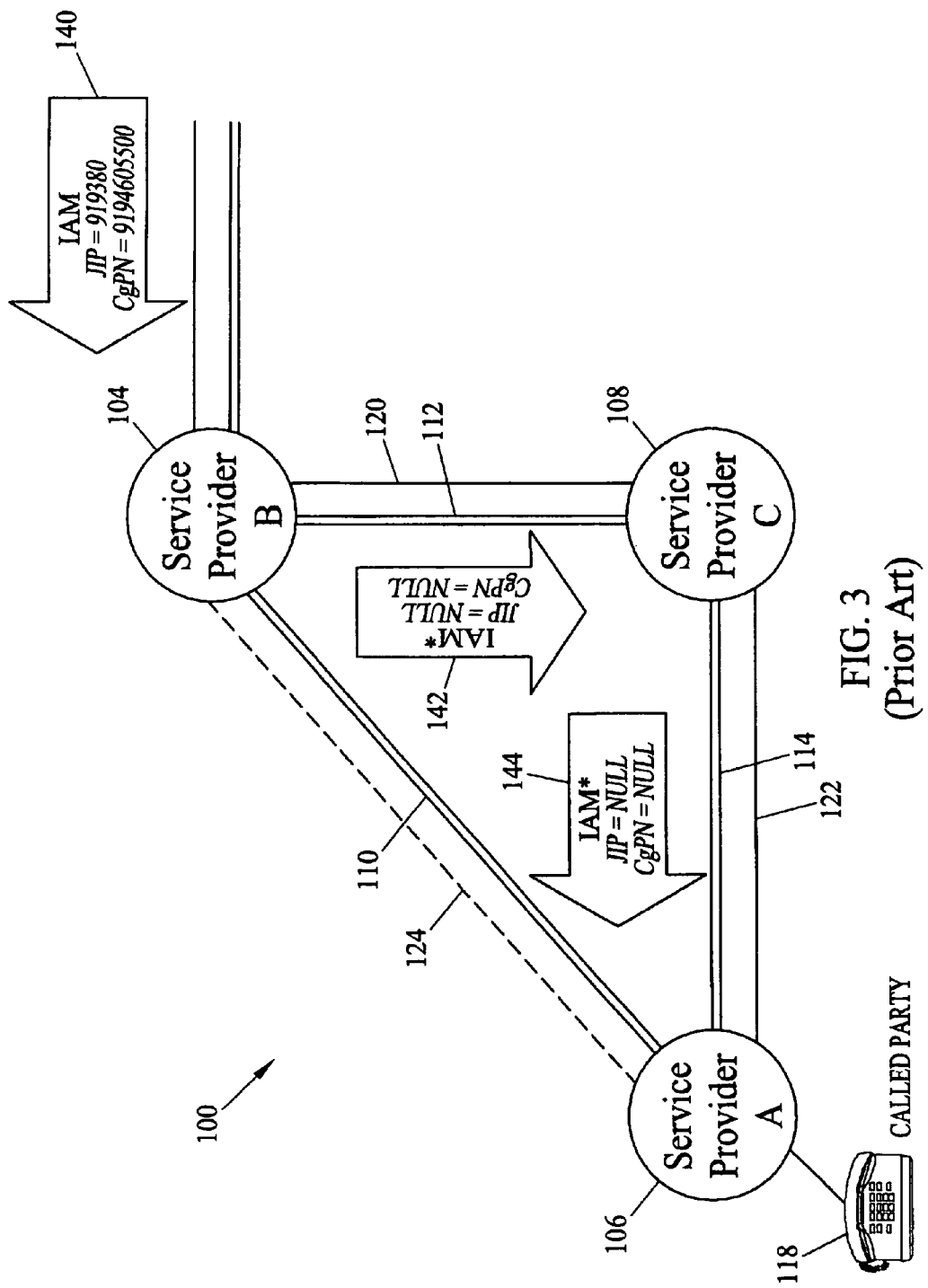
FIG. 3 is a network diagram illustrating a message flow associated with an arbitrage call routing scenario in a telecommunications network.
Figure 4:
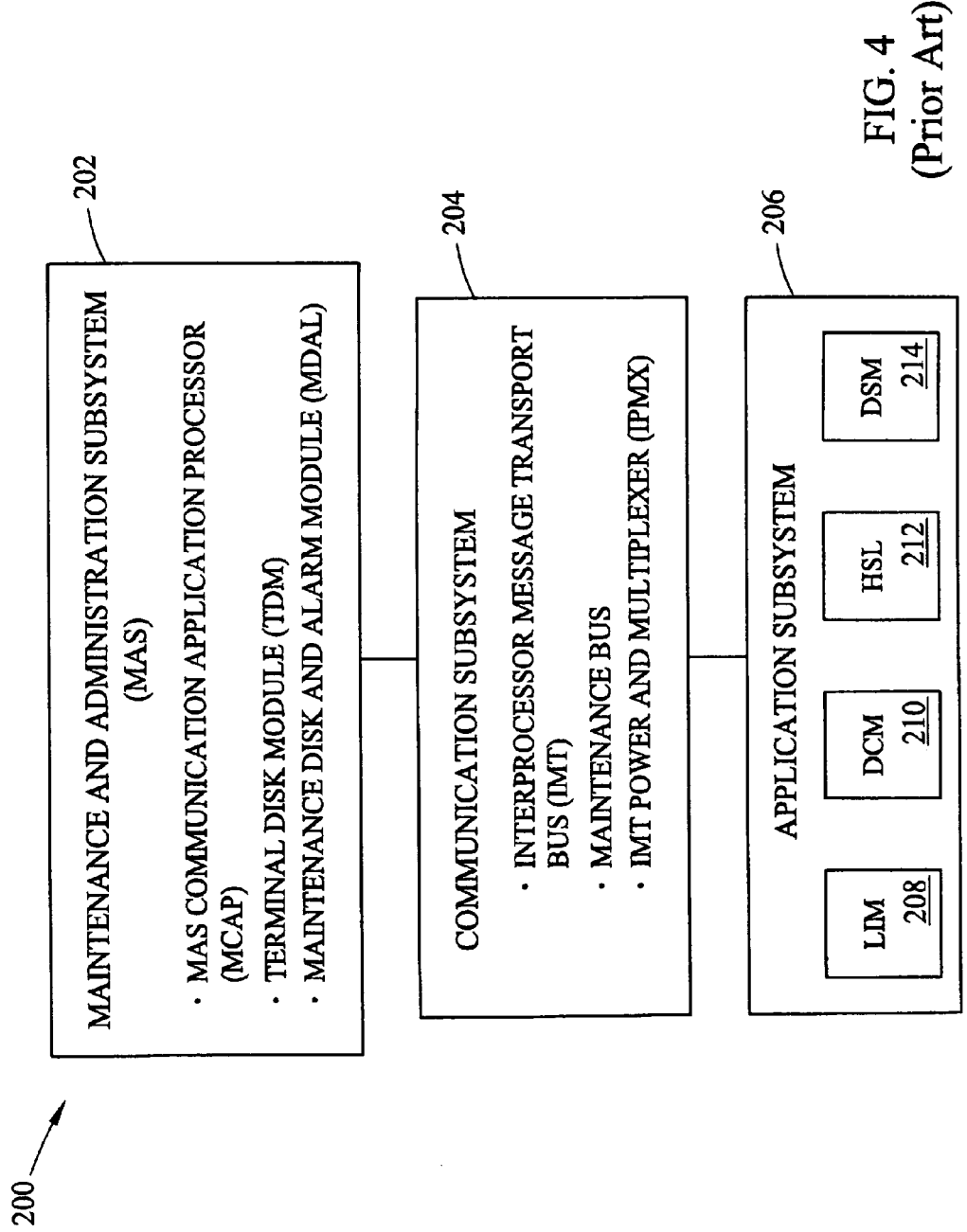
FIG. 4 is block diagram illustrating an exemplary architecture of a signaling gateway (SG) routing node suitable for use with embodiments of the present invention.

Disclosed herein are several embodiments of the present invention, some of which may include an underlying hardware platform similar to that of a signal transfer point (STP) or an SS7-over-Internet protocol signaling gateway. FIG. 4 is a block diagram illustrating an exemplary SG node 200, which employs a distributed, multi-processor system architecture suitable for use with embodiments of the present invention. As shown in FIG. 4, SG 200 includes the following subsystems: a maintenance and administration subsystem (MAS) 202, a communication subsystem 204 and an application subsystem 206. MAS 202 provides maintenance communications, initial program loading, peripheral services, alarm processing and system disks. Communication subsystem 204 includes an interprocessor message transport (IMT) bus. The IMT bus facilitates communication among the various modules and subsystems that comprise the SG. In one exemplary implementation, the IMT bus includes two 1 Gbps counter-rotating serial rings. In an alternate implementation, communication subsystem 204 may include a local area network, such as an Ethernet, for connecting the modules and subsystems comprising SG 200.

Application subsystem 206 includes application cards or printed circuit boards capable of communicating with the other cards through the IMT communications bus or network. Numerous types of application cards can be included in SG 200. Exemplary application cards include an SS7 link interface module (LIM) 208 that provides SS7 links and X.25 links, a data communication module (DCM) 210 that provides an Internet protocol (IP) signaling interface to external nodes, and a high-speed asynchronous transfer mode (ATM) communication link module (HSL) 212. A database services module (DSM) 214 may host one or more signaling message processing applications, such as global title translation, flexible routing, number portability translation, and an arbitrage detector according to the present invention.

The architecture illustrated in FIG. 4 may be used to implement an arbitrage screening and mitigation application of the present invention for ISDN user part (ISUP) messages as well as IP-encapsulated or IP-adapted ISUP signaling messages, such as Internet Engineering Task Force (IETF) SIGTRAN M3UA protocol messages. An arbitrage screening and mitigation application of the present invention may also process other non-SS7 signaling protocol messages, such as session initiation protocol (SIP) signaling messages, media gateway control protocol (MGCP) signaling messages, MEGACO signaling messages, H.323 signaling messages, and the like.

Figure 5:
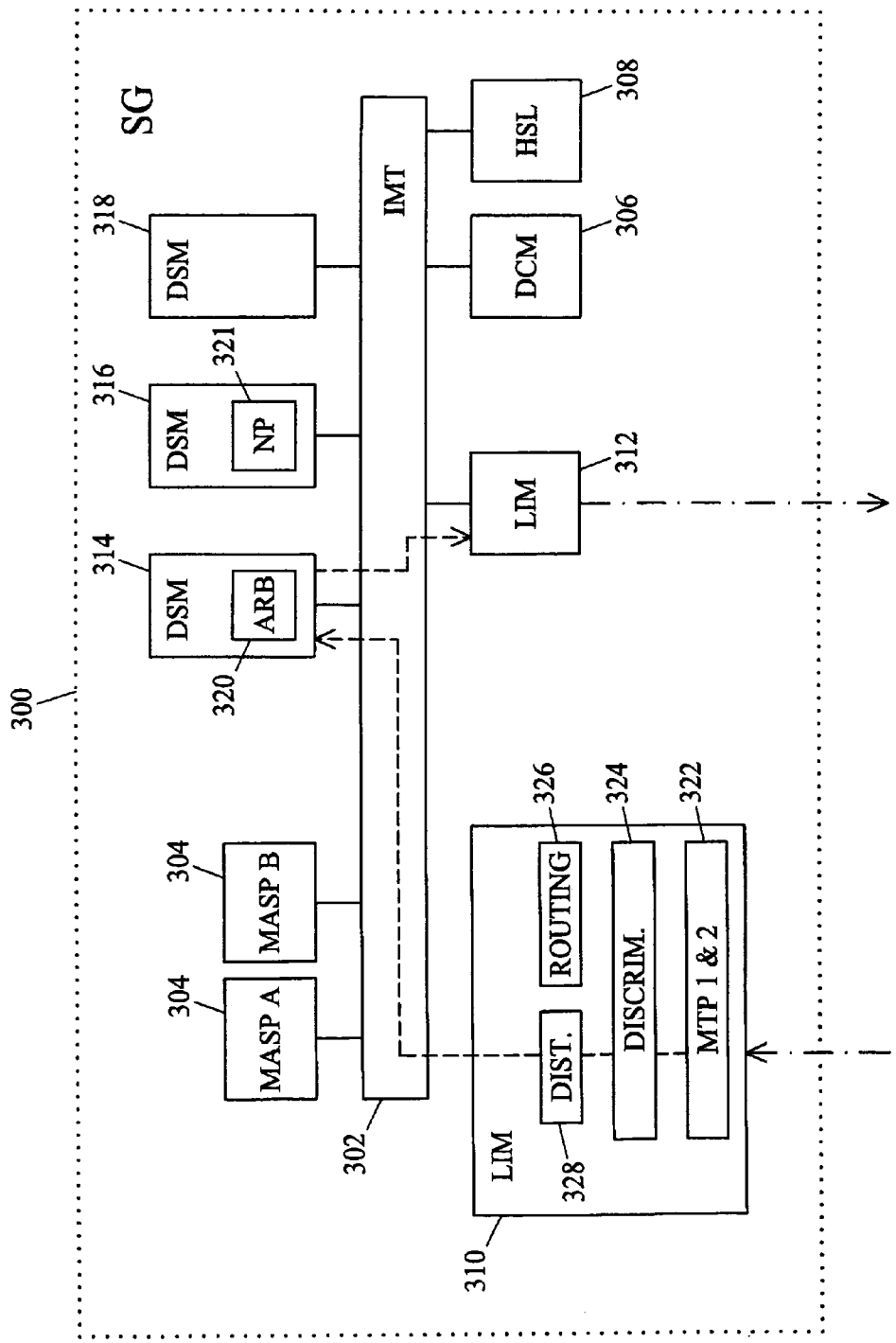
FIG. 5 is a system block diagram illustrating a routing node including an integrated database services module for performing arbitrage detection and mitigation processing according to an embodiment of the present invention.

FIG. 5 illustrates an SG routing node 300 including an arbitrage detector/processor located on a database services module according to an embodiment of the present invention. In FIG. 5, SG routing node 300 includes a high speed IMT communications bus 302 and a pair of MASP processor modules 304. MASP pair 304 implement the maintenance and administration subsystem functions described above. As MASP pair 304 are not essential to a discussion of the arbitrage function of the present invention, a detailed discussion of their operation is not provided herein. IMT bus 302 may be a counter-rotating dual ring bus or an Ethernet, as described above.

A number of distributed processing communication and application modules or cards may be coupled to IMT bus 302. In FIG. 5, these processing modules or cards include an IP-capable DCM 306, an ATM-capable HSL communication module 308, a pair of SS7 LIMs 310 and 312, and a plurality of DSMs 314, 316, and 318. DSM 314 may include an arbitrage detector/processor 320 according to an embodiment of the present invention. DSM 316 may include a number portability translation database 321 for storing jurisdictional information useful in mitigating call arbitrage.

Each processing module in FIG. 5 may include hardware, software, and/or firmware for performing the indicated functions. For example, in one implementation, each module may include an application processor for processing and routing signaling message and a communications processor for inter-processor communication via bus 310. Providing a distributed processing architecture, such as that illustrated in FIG. 5, increases message throughput and decreases on-the-fly processing time for each message, even when arbitrage screening and mitigation is performed.

In FIG. 5, a single DSM is provisioned to provide arbitrage detection processing functionality within SG 300. However, multiple DSMs with arbitrage detection may be simultaneously deployed within SG 300 without departing from the scope of the invention. In addition, arbitrage detector/processor 320 may be located on the link interface modules, such as LIM 310 or DCM 306, without departing from the scope of the invention.

As stated above, LIMs 310 and 312 communicate with other nodes via external SS7 signaling links. As such, each LIM may be connected to other signaling points in a network via one or more individual SS7 signaling links, where an SS7 signaling link is typically a 56 kbps or 64 kbps DS-0 link. Multiple signaling links connected to a common destination may be grouped into a virtual entity known as an SS7 signaling linkset.

DCM 306 includes IP transport capabilities. DCM 306 may be connected to external nodes via one or more IP-based signaling linksets. DCM 306 may transmit any type of signaling messages over the IP based signaling linksets. Examples of signaling messages that may be transmitted over IP signaling links by DCM 306 include SS7 signaling messages, SIP signaling messages, and H.323 signaling messages.

As illustrated in FIG. 5, LIM 310 includes an SS7 MTP level 1 & 2 function 322, a message discrimination function 324,. a routing function 326 and a message distribution function 328. MTP level 1 and 2 function 322 provides the facilities necessary to send and receive digital data over a particular physical medium, as well as to provide error detection, error correction and sequenced delivery of SS7 messages. Message discrimination function 324 receives signaling messages from the lower processing layers and performs a discrimination function that determines whether an incoming SS7 message requires internal processing or is simply to be through switched. In one exemplary implementation, discrimination function 324 may perform an arbitrage pre-screening function to identify messages as candidates for arbitrage processing. For example, discrimination function 324 may examine the SI and ISUP message type parameters to identify ISUP IAM messages as candidates for arbitrage processing. In an alternate implementation, discrimination function 324 may determine whether a signaling message is a candidate for arbitrage processing based on the signaling link or signaling linkset on which the message is received. The remaining ISUP originating party and jurisdictional information parameters may be examined by discrimination function 324 and/or arbitrage detector/processor 320 to determine whether the call associated with the message is being improperly routed. Performing arbitrage prescreening on the LIMs is advantageous because such prescreening distributes arbitrage detection processing over multiple processors.

DCM 306 may also include a discrimination function that identifies IP-based signaling messages as candidates for arbitrage processing. For IP-based SS7 signaling messages, the discrimination function on DCM 306 may examine the same parameters that discrimination function 324 on LIM 310 examines. For other types of signaling messages, DCM 306 may examine parameters that determine whether the message type is an initial call signaling message and therefore a candidate for arbitrage processing. For example, for SIP messages, the discrimination function on DCM 306 may identify INVITE messages as candidates for arbitrage processing. For H.225 messages, the discrimination function on DCM 306 may identify CONNECT messages as candidates for arbitrage processing. Subsequent arbitrage screening for the identified candidates may be performed by the discrimination function on DCM 306 or by arbitrage detector/processor 320, as will be described in detail below.

For received signaling messages that simply require MTP routing, routing function 326 is responsible for examining these messages and determining on which outbound MTP signaling link or IP signaling link over which these messages are to be transmitted. Routing function 326 may transmit the messages to the outbound communication module (e.g., LIM, DCM, HSL) associated with the selected signaling link via IMT bus 302.

If discrimination function 324 determines that a received signaling message requires processing by an internal application processor or associated subsystem of SG node 300, such as an arbitrage application, then the message is passed to message distribution function 328. An associated subsystem may be an adjunct message processing platform, such as a computer workstation or server, that is connected to the SG via an external communication connection, such as an Ethernet connection. For example, discrimination function 324 may determine that a received SS7 signaling message requires arbitrage processing if the message includes an SI parameter value of 5, indicating that the message is an ISUP message. In one implementation discrimination function 324 may decode the ISUP parameters in the signaling message to produce a decode key and forward the decode key along with the signaling message to arbitrage detection DSM 314 via IMT bus 302. Arbitrage processing may be performed by DSM 314, which may result in some or no modification of a received signaling message and/or, in some cases, the creation of a new signaling message. Upon completion of arbitrage processing, messages may be directed from DSM 322 to an outbound LIM via IMT bus 302, as generally indicated in FIG. 5.

The present invention is not limited to the specific architecture illustrated in FIG. 5. Multiple LIMs, DCMs, HSLs, DSMs, and other types of communication and processing modules may be included without departing from the scope of the invention.

Figure 6:
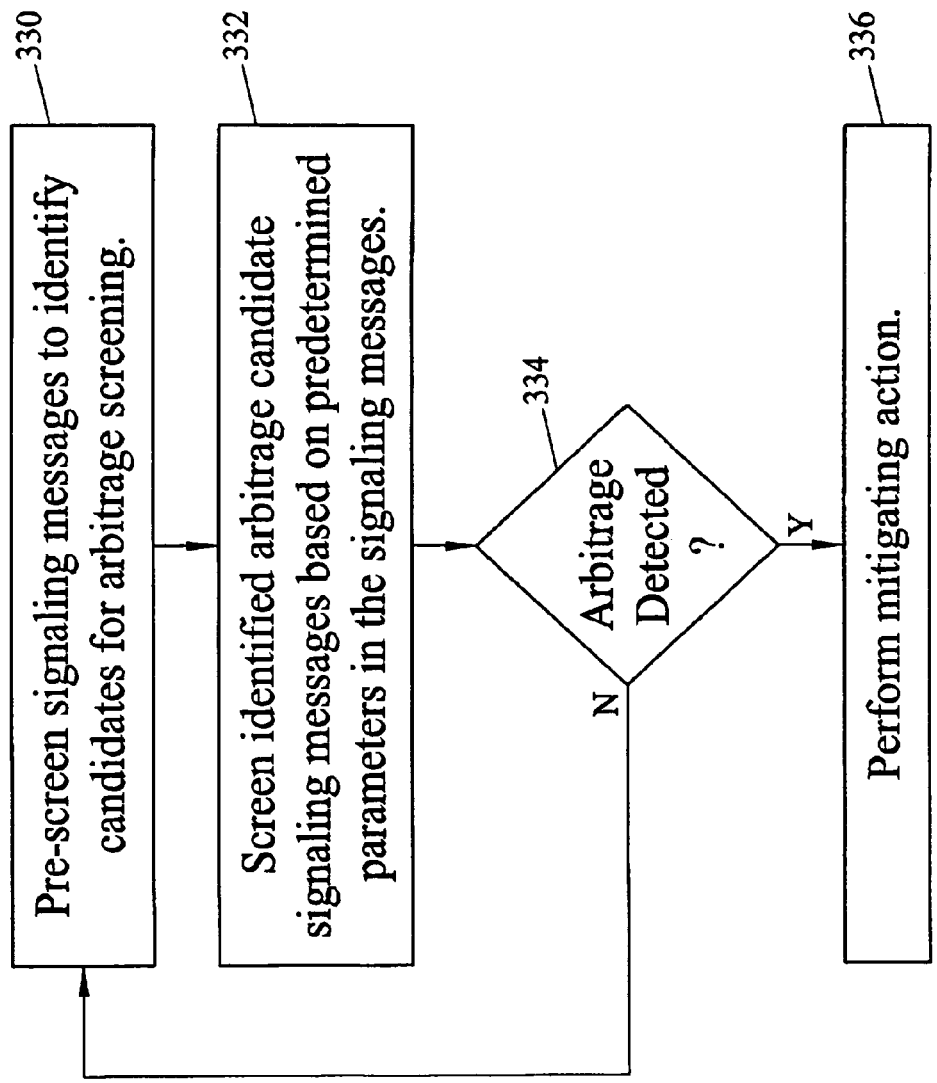
FIG. 6 is a flow chart illustrating exemplary steps that may be performed in identifying and mitigating call arbitrage according to an embodiment of the present invention.

FIG. 6 is a flow chart illustrating exemplary steps that may be performed in identifying and mitigating call arbitrage according to an embodiment of the present invention. The steps illustrated in FIG. 6 may be performed by arbitrage detector/processor 320 and/or discrimination function 324 illustrated in FIG. 5. The particular distribution of processing responsibility between these functions may depend on the relative processing load between LIM 310 and DSM 314. In one exemplary implementation, discrimination function 324 may perform initial arbitrage pre-screening and arbitrage detector/processor 320 on DSM 314 may perform the arbitrage screening and mitigation operations.

Referring to FIG. 6, in step 330, a plurality of signaling messages are received and candidates for arbitrage screening are identified. Step 330 may be performed by examining the message type. If the message type indicates that the signaling message is an initial call setup signaling message, such as an IAM message, an INVITE message, a CONNECT message, etc., the signaling message may be identified as a candidate for arbitrage screening.

In step 332, for the signaling messages identified as candidates for arbitrage screening, arbitrage screening is performed. This step may include examining one or more originating party parameters and/or jurisdictional information parameters in the candidate signaling messages to determine whether the parameters have been altered or have been deleted from the signaling messages. As discussed above, one method for performing call arbitrage is to replace or nullify calling party parameters in ISUP IAM messages. Thus, if a received ISUP IAM message does not include a calling party number, call arbitrage may be identified. In another example, determining whether a calling party number is valid may include comparing the calling party number to a list or range of expected or valid calling party numbers. If the received calling party number is not within the range or list, the calling party number is identified an invalid and arbitrage is indicated. In another example, identifying the presence of call routing arbitrage may include comparing the calling party number to a value or range of values known to be used for call routing arbitrage. The values that arbitrage detector/processor 320 uses to detect the presence of call routing arbitrage are preferably customizable by the network operator. Similar detection rules may be used to check other parameters in a signaling message, such as JIP or CIC parameter.

In step 334, if call arbitrage is not identified, control returns to step 330 where the pre-screening of signaling messages continues. However, if call arbitrage is identified in step 334, control proceeds to step 336 where a mitigating action is performed. The particular mitigating action performed depends on the network implementation. Exemplary mitigating actions that will be described in detail in the message routing scenarios described below include releasing calls, redirecting calls, and reconstructing signaling messages to complete calls for which call arbitrage has been identified.

Arbitrage Detector/Processor

FIG. 6 is a functional block diagram of an arbitration detector/processor according to an embodiment of the present invention. In the illustrated example, arbitrage detector/processor 320 includes a screening function 340, a call release function 342, a call redirect function 344, a call pass function 346, and a message accounting and reporting function 348. Screening function 340 may examine calling party number and JIP parameters contained in a received ISUP IAM signaling message, and determine whether that these parameters contain null or invalid values. Screening function 340 may also examine other information that is located in or implied by a received signaling message. Examples of other parameters located in an ISUP IAM message that may be examined include a carrier identification code parameter and an originating node address, such as an originating point code. Examples of information implied by a received signaling message include the signaling link or linkset on which a message is received. For received SIP messages, screening function 340 may examine the SIP from parameter to determine whether the message contains a valid originating SIP URI. Examining any type of originating party information in a received signaling message to identify the presence of arbitrage is intended to be within the scope of the invention.

If screening function 340 determines that arbitrage has occurred, screening function 340 may direct a screened signaling message to one of the provisioned functions 342, 344, or 346. The particular function depends on the network implementation and is preferably configurable by the network operator. For example, some network operators may desire to release all calls for which arbitrage is detected. Accordingly, in such networks, the signaling messages associated with these calls would be directed to release function 342. Other network operators may desire to reconstruct call signaling messages and route calls using the reconstructed call signaling messages. In this situation, screening function 340 may redirect signaling messages for which arbitrage has been detected to redirect function 344. Finally, other operators may desire to pass calls for which arbitrage has been detected and generate accounting records for later analysis. In such situations, screening function may redirect signaling messages for which arbitrage has been detected to pass function 346. A single network operator may configure different arbitrage mitigation actions to be performed depending on the type or severity of call routing arbitrage. For example, a network operator may initially configure arbitrage detector/processor 320 to pass all calls for which arbitrage has been detected but to generate reports. Upon analysis of the reports, the network operator may identify a particular carrier as a repeat offender. In this situation, the network operator may re-configure arbitrage detector/processor 320 to block calls from the repeat offender and to pass other calls, while generating reports.

As indicated above, call release function 342 may prevent the setup of a call identified as being subject to arbitrage. For example, call release function 342 may simply discard a received call setup signaling message, thereby terminating call setup. In an alternate implementation, screening function 340 may forward the signaling message to release function 342, and release function 342 may generate and return a release message so as to more gracefully terminate an arbitrage-related call setup attempt. In an SS7 signaling environment, release function 342 may generate an ISUP REL message that is associated with a received ISUP IAM message. Release function 342 may include within the REL message a release cause code, which indicates that call setup is being terminated because arbitrage is suspected or because insufficient information (e.g., CgPN, JIP, etc.) is present in the received ISUP IAM message. Release function 342 may also notify message accounting and reporting function 348 of such call setup termination activity, whereby function 348 is adapted to record and report information associated with the release mediation action. Information recorded and reported by function 348 may include some or all of the received call setup message, the receipt time, the receipt date, and receiving or inbound link or linkset. Peg count type information associated with arbitrage related call setup messages may also be recorded and reported by function 348.

For non-SS7 calls, release function 342 may either discard received signaling messages for which arbitrage has been detected or send a release message in the appropriate protocol type. For example, for SIP signaling, release function 314 may send a BYE or CANCEL message to end the call setup. In H.225 signaling environment, release function 342 may send a release message in response to signaling messages for which arbitrage has been detected.

Call redirect function 344 may redirect a call that suspected of arbitrage routing in such a manner that the calling party is connected to an interactive voice response (IVR) server or a tone and announcement server (TAS). In the case of redirection to a TAS, the serving TAS may play the calling party a message, which explains why the call cannot be completed. In the case of redirection to an IVR, the serving IVR may request and collect information from the calling party prior to completion of the call to the original called party. If the requested information is successfully collected by the IVR server, call setup to the original called party may continue. If the requested information is not collected by the IVR server, the call may be terminated. Exemplary information collected from a calling party may include, the calling party telephone number, calling party geographic location information, and calling party service provider and/or carrier identification information. In a manner similar to that described above with respect to release function 342, redirect function 344 may notify message accounting and reporting function 348 of such call redirection activity. Message accounting and reporting function 348 may record and report information associated with the redirect action. Information recorded and reported by function 348 may include some or all of the received call setup message, the receipt time, the receipt date, the receiving or inbound link and/or linkset, the redirected IVR identifier, and/or the redirected TAS identifier. The redirect IVR or TAS nodes may also record and report similar information associated with the processing of arbitrage related calls.

Call pass function 346 may notify message accounting and reporting function 348 of a call that suspected of arbitrage routing and subsequently route the call to the specified called party. In this case, a call setup attempt that is believed to be associated with an arbitrage scenario is simply noted or recorded by arbitrage detector 320 for future reporting or analysis.

Exemplary Arbitrage Call Release Scenario

Figure 8:
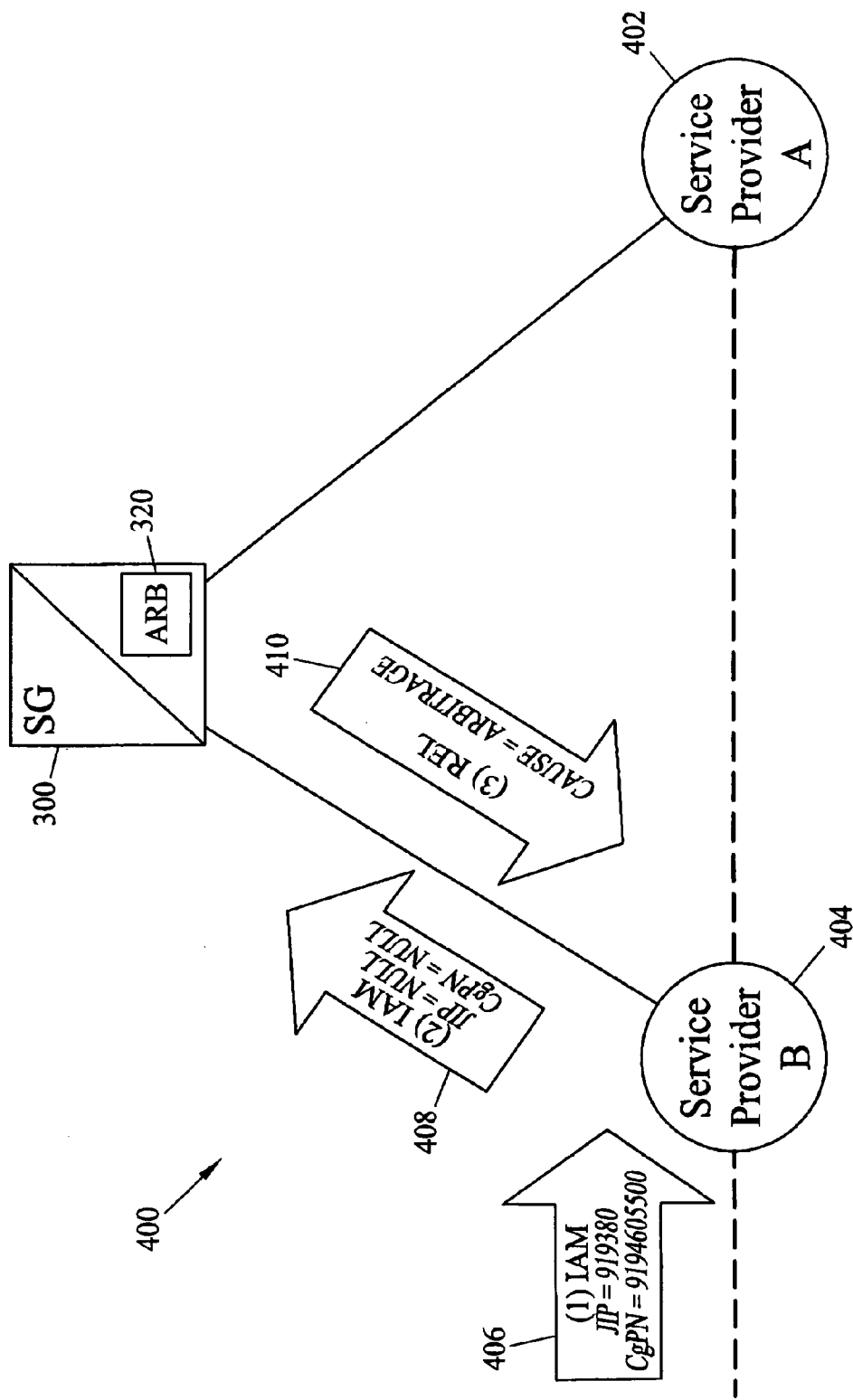
FIG. 8 is a network diagram illustrating messaging associated with a call release arbitrage mitigation action of the present invention.

FIG. 8 is a message flow diagram illustrating an example of call release arbitrage scenario that may be implemented by arbitrage detector/processor 320. In FIG. 8, network 400 includes an arbitrage-detector-equipped SG node 300, similar to that illustrated in FIG. 5. Network 400 also includes a switching office 402 associated with a first service provider, Service Provider A and a switching office 404 associated with a second service provider, Service Provider B. The illustrated signaling message flow includes a first ISUP IAM message 406, which is received at tandem switching office 404. ISUP message 406 includes a JIP parameter value of 919380, and a calling party number parameter value of 9194605500. In response to receiving ISUP message 406, tandem switching office 404 generates a new, related, ISUP IAM signaling message 408. Signaling message 408 is formulated by switch 404 such that the JIP and calling party number parameters are erased and set to null values. Message 408, which is intended to establish a voice circuit between office 404 and office 402, is transmitted to SG 300 for subsequent routing to office 402. However, upon receipt of message 408, SG 300 screens the message and determines that the message requires arbitrage processing, detects the null JIP and calling party parameters, discards the message, and sends a release message 410 indicating that the call has been released because of arbitrage.

Referring to the system diagram of SG 300 in FIG. 5, message 408 is received at SG 300 by LIM 310. Lower level MTP processing is performed via MTP level 1 and 2 function 322, and the message is passed to discrimination function 324, where arbitrage pre-screening is performed. Since the message is an IAM message, discrimination function 310 forwards the message to arbitrage detector/processor 320. Arbitrage detector/processor 320 examines the contents of message 408 to determine whether calling party number and JIP parameter information is present and valid. In this example, it is determined that CgPN and JIP parameter information is not present, and screening function 340 therefore directs the message to release function 342. Release function 342 discards the IAM message and formulates a release message indicating that the reason the call was dropped was arbitrage.

Exemplary Arbitrage Call Redirect Scenario

Figure 9:
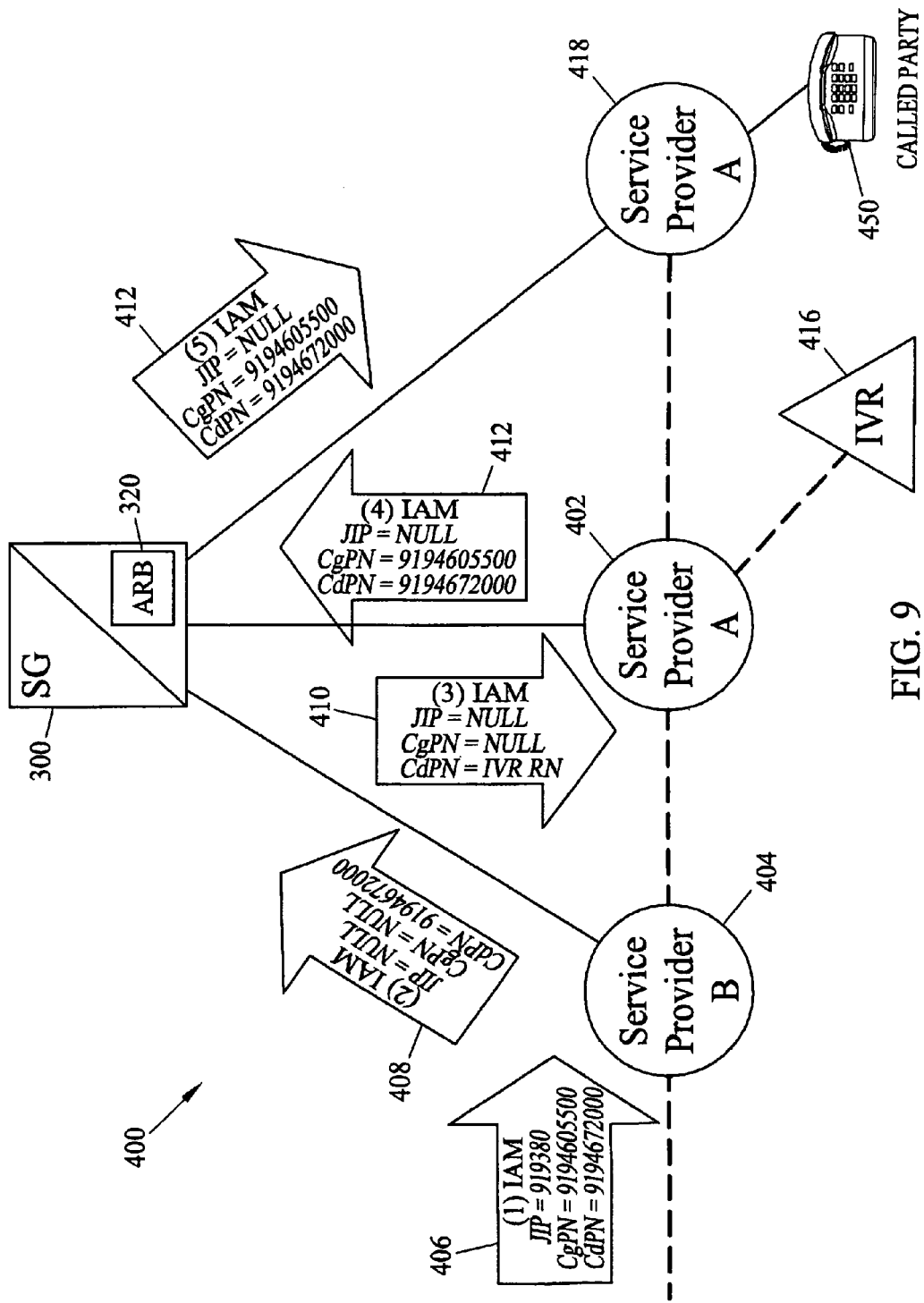
FIG. 9 is a network diagram illustrating call setup to an Interactive Voice Response (IVR) node associated with a call redirect arbitrage mitigation action of the present invention.
Figure 10:
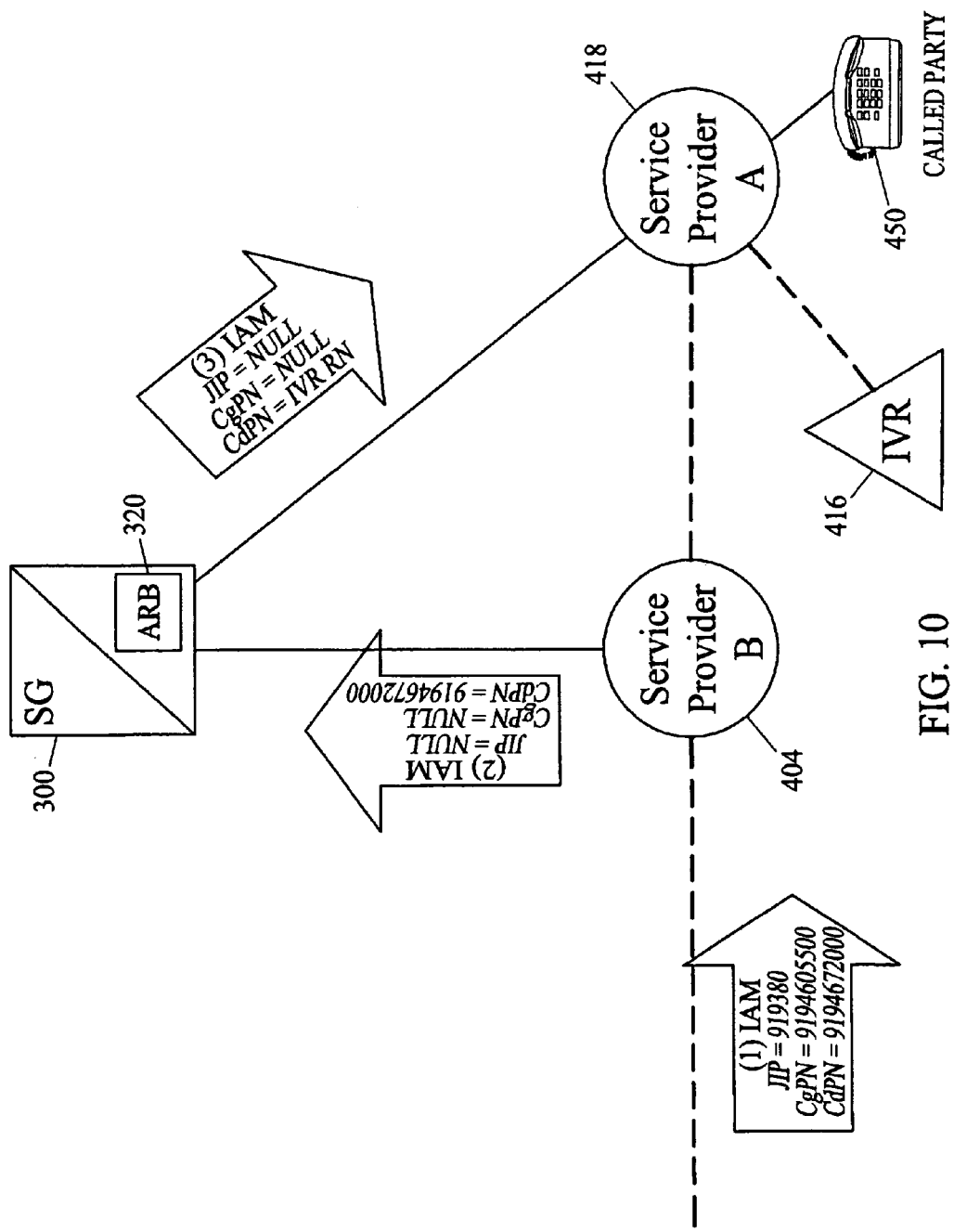
FIG. 10 is a network diagram illustrating call setup in which a call for which arbitrage is detected is redirected to an IVR node associated with the called party end office according to an embodiment of the present invention.

FIGS. 9 and 10 illustrate an example of call redirection in response to arbitrage according to an embodiment of the present invention. In FIG. 9, network 400 includes an arbitrage detection and processing equipped SG node 300, similar to that described above and illustrated in FIG. 5. Network 400 also includes an IVR node 416 to which arbitrage related calls are redirected. As in the previous example, the illustrated signaling message flow includes a first ISUP IAM message 406, which is received at tandem switching office 404. ISUP message 406 includes a JIP parameter value of 919380 and a calling party number parameter value of 9194605500. In response to receiving ISUP message 406, tandem switching office 404 generates a new, related, ISUP IAM signaling message 408. Signaling message 408 is formulated by switch 404 such that the JIP and calling party number parameters are erased and set to null values. Message 408, which is intended to establish a voice circuit between office 404 and office 402, is transmitted to SG 300 for subsequent routing to office 402. However, upon receipt of message 408, SG 300 screens the message and determines that the message requires arbitrage processing.

The screened ISUP IAM message 408 is directed to arbitrage detector/processor 320 for arbitrage processing. In this case, ISUP IAM message 408 is directed by screening function 340 to call redirect function 344. Call redirect function 344 moves the original called party telephone number information from a called party number parameter in the ISUP IAM message and places the number in another location within the IAM message, such as a generic address parameter (GAP). Subsequently, a routing number associated with an IVR server (or TAS) is inserted in the called party number parameter of the IAM message, and the modified message 410 is routed from SG 300 to switch 402. Switch 402 receives IAM message 410, selects a voice trunk and routes an associated IAM message 412 to IVR 416 via SG 300. A voice connection is established between the calling party and arbitrage IVR node 416.

Arbitrage IVR node 416 requests and collects information associated with the call from the calling party. For example, IVR 416 may play a recorded message, which requests that the calling party to specify his or her phone number either by speaking the number or by using a telephone keypad. The IVR may also request that the calling party identify the calling party's long-distance carrier. If this information is successfully collected, the information may be inserted into an associated ISUP IAM message, which is in turn used to complete call setup to the original called party (i.e., the telephone number that was temporarily stored in the GAP parameter).

If IVR 416 successfully collects the dialed digits, tandem office 402 may formulate an IAM message 412 with the appropriate dialed digits in the message and forward IAM message 412 to called party end office 418 via signaling gateway 300. Since the IAM message includes a valid calling party address, the message may pass arbitration screening and be forwarded to end office 418. End office 418 may then complete the call using standard call setup procedures.

If IVR 416 is not successful in collecting the calling party dialed digits, IVR 416 may play an announcement to the calling party indicating that the call will not be completed and instruct tandem office 402 to drop the call. Alternatively, tandem office 402 may allow the call to be completed and arbitrage detector 320 may simply generate a report so that the service provider can identify that arbitrage has occurred and prevent future instances of call arbitrage without dropping any calls in progress.

FIG. 10 illustrates an alternate implementation of the invention in which IVR 416 is located at called party end office 418. In the message flow illustrated in FIG. 10, service provider B 404 nullifies calling party information in an IAM message, as described in the previous examples. Arbitrage screening function 320 detects the presence of call arbitrage and routes the call to IVR 416 associated with end office 418. IVR 416 attempts to collect the calling party dialed digits. If IVR 416 is successful in collecting the calling party dialed digits, the call may be completed as normal. On the other hand, if IVR 416 is not successful in collecting the calling party dialed digits, IVR 416 may play an announcement indicating that the call will not be completed, and end office 418 may drop the call. Alternatively, end office 418 may complete the call, and arbitrage detector 320 may generate a report to the service provider to prevent future call routing arbitrage. Thus, in the embodiment illustrated in FIG. 10, where IVR 416 is located at the called party end office, the amount of processing performed by arbitrage detector 320 is reduced because arbitrage detector 320 is only required to process a single IAM message.

Arbitrage with Number Portability

Even with an IVR redirect, such as that described above, it is possible that collected calling party information may not be sufficient to completely mitigate or prevent arbitrage call routing. The widespread implementation of number portability within telephone networks (both wireline and wireless) present such a challenge. In cases where a calling party has been ported (e.g., geographically, between service providers, etc.), the calling party telephone number may be insufficient to identify and/or mitigate call routing arbitrage. In these cases, a jurisdiction identification parameter (JIP) contained in an ISUP IAM message may be necessary to resolve questions of call routing arbitrage. With this problem in mind, a slight variation of the above described arbitrage mitigation processes (i.e., call pass, call redirect) may be implemented in such a manner as to obtain or verify the JIP parameter value in a received ISUP signaling message.

In one embodiment, SG node 300 may access a number portability (NP) database during arbitrage processing. The NP database may be co-located with SG 300 or the NP database may reside elsewhere in the signaling network or a data network. In the example shown in FIG. 11, arbitrage detector/process 320 queries an internal NP database 321 and thereby obtain and/or verify a JIP parameter value associated with a call. The JIP value associated with a call is usually the first six digits (i.e., NPA-NXX) of the location routing number (LRN) that is assigned to the switch that originates a call. It is also possible that a JIP data field may be included in NP database 321 if the first six digits of the LRN are not used as the JIP value. In any event, NP database 321, which associates subscriber telephone numbers with switch LRN values (or JIP values) may be used to resolve a JIP parameter value if one is not present, or has been stripped from a signaling message. Table 1 shown below illustrates subscriber telephone number information and associated LRN data that may be contained in number portability database 321. Using the exemplary data shown in Table 1, a JIP parameter value of 919380 may be determined from an NP database lookup for a call associated with a calling party whose telephone number is 9194605500.

TABLE 1

Sample Number Portability Data

| Subscriber Telephone Number | LRN |
|---|---|
| 9194605500 | 9193801000 |
| 9194605501 | 9194600000 |
| 9194605502 | 9194600000 |
| 9194605503 | 9194600000 |

Figure 7:
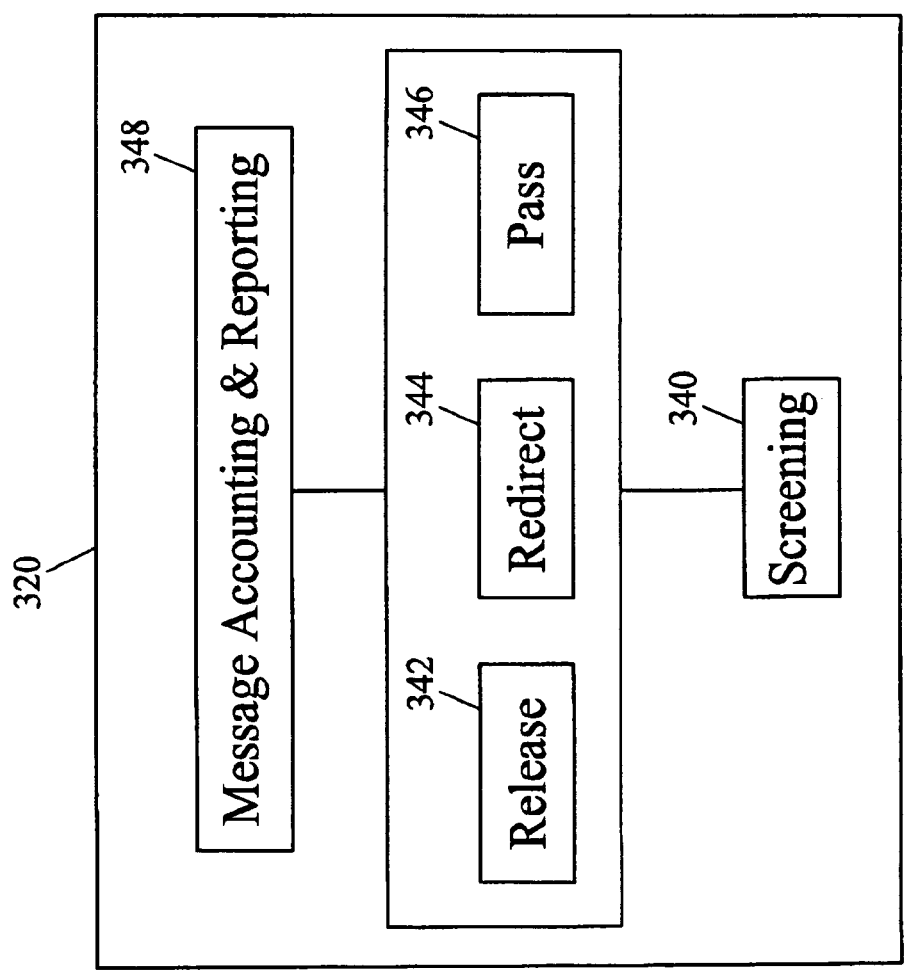
FIG. 7 is a functional block diagram of an arbitrage detector/processor according to an embodiment of the present invention.
Figure 11:
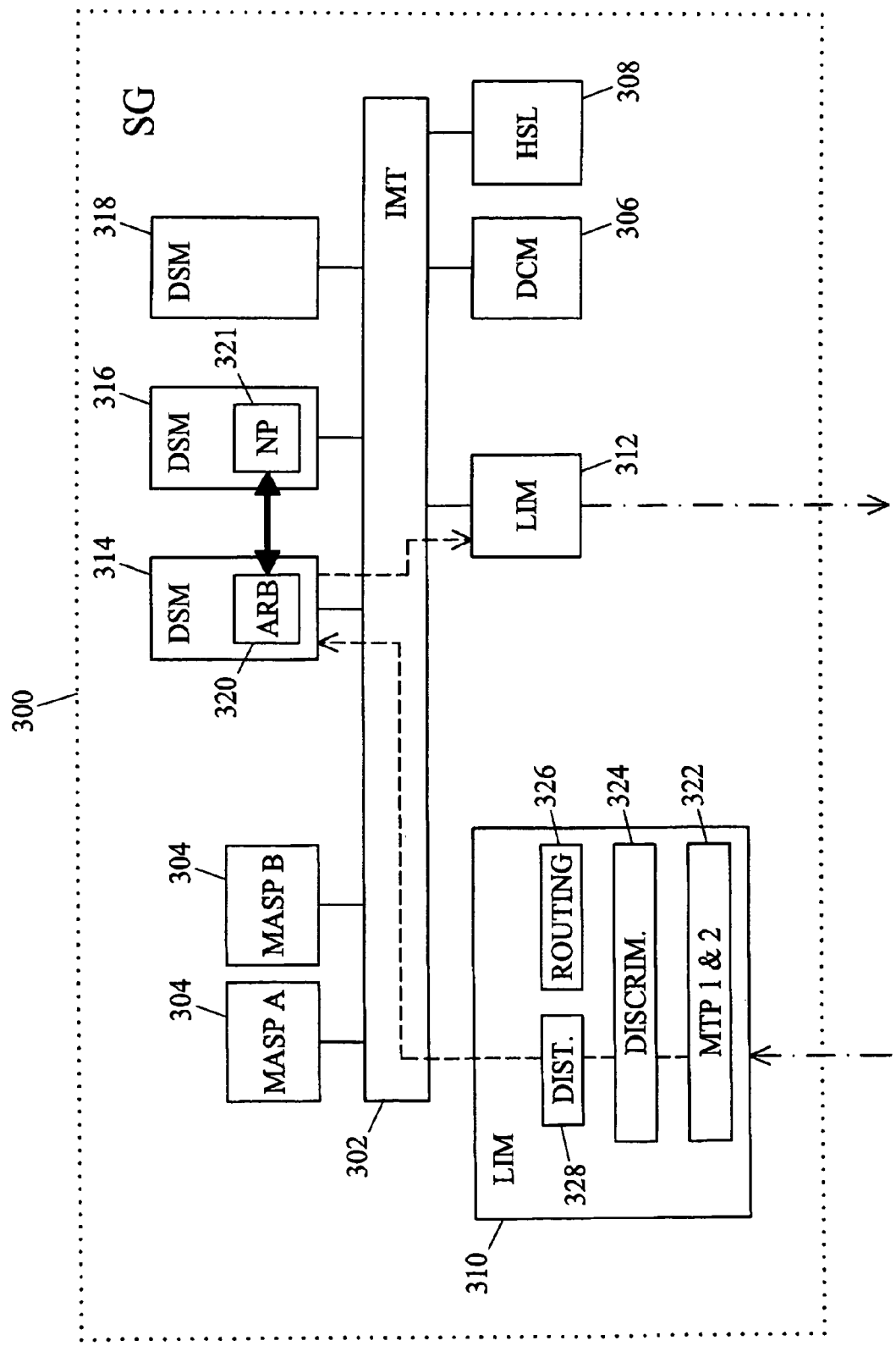
FIG. 11 is a block diagram and associated message flow of a routing node including an integrated database services module for providing a number portability database according to an embodiment of the present invention.
Figure 12:
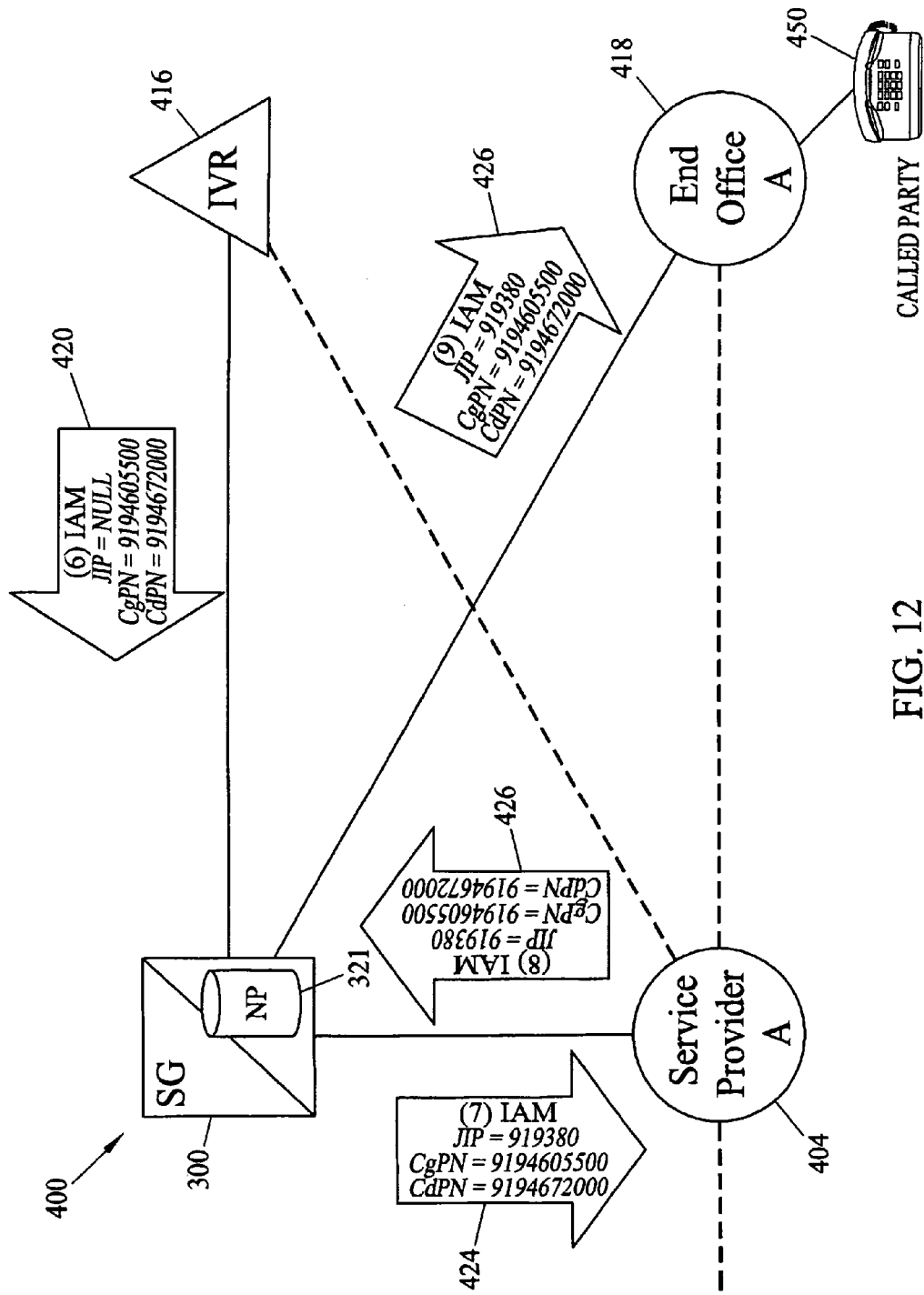
FIG. 12 is a network diagram illustrating number portability database access to determine call jurisdiction associated with one aspect of the present invention.

FIG. 12 illustrates a variation of the arbitrage processing scenario described above with respect to FIG. 9. In FIG. 12, it is assumed that SG 300 has identified arbitrage based on an IAM message, that SG 300 has forwarded the IAM message to IVR 416, and that IVR 416 has collected calling party telephone number information and inserted this information into ISUP IAM message 420, which is routed to SG 300. SG 300 intercepts message 420 and directs the message to arbitrage detector/processor 320 for processing, as indicated in FIG. 11. Arbitrage detector/processor 320 queries NP database 321 and obtains the correct JIP parameter value of 919380. The JIP parameter value is inserted into the modified ISUP IAM message 424. The JIP parameter may also be recorded and reported by message accounting and reporting function 348 (illustrated in FIG. 7). Modified IAM message 424 is routed from SG 300 to switch 404, which in turn generates a related IAM message 426, which is routed to the end office 418 that is serving called party 450. Determining the correct jurisdiction of a call enables arbitrage call routing to be much more easily identified and mitigated.

In the example illustrated in FIG. 11, arbitrage detector/processor 320 queries NP database 321. In an alternate embodiment, IVR node 416 may directly query an NP database in order to verify JIP parameter information following collection of calling party information. The NP database may be co-located with the arbitrage mitigation equipped SG 300 or may reside elsewhere in the network.

In cases where the selected arbitrage mitigation action is the "pass" function, an NP database query similar to that described above may be performed. If the received signaling message is missing a JIP parameter, the JIP information returned from the NP database query may be inserted into the received message prior to routing the message from the SG node. As such, the call setup attempt is not blocked by SG 300, but the correct JIP information is inserted into the call setup message, and may be later used by Service Provider A to determine if arbitrage has occurred. The JIP information returned from the NP database lookup may also be recorded and reported by message accounting and reporting function 348.

Soft Switch/Media Gateway Controller Implementation

Figure 13:
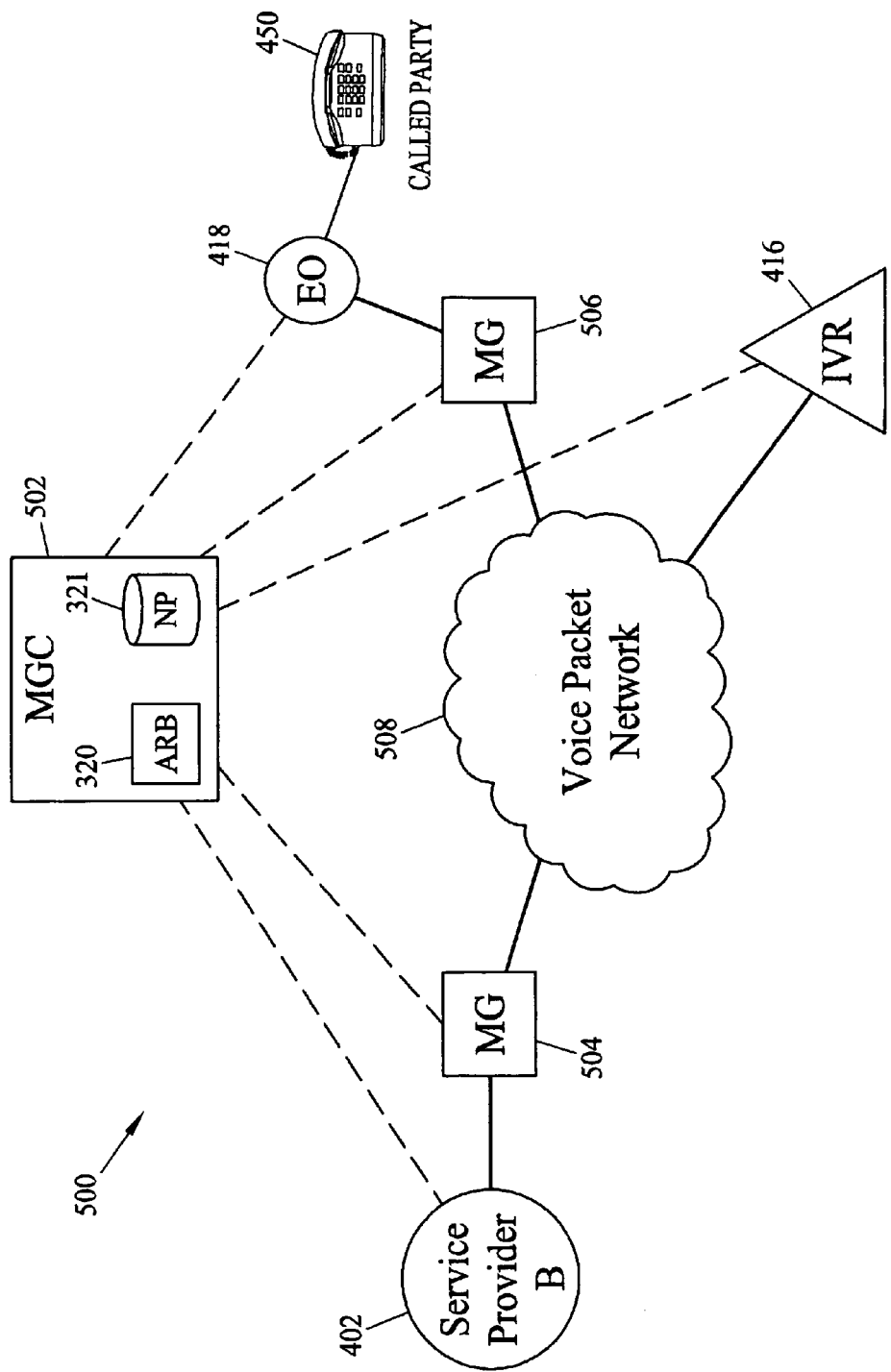
FIG. 13 is a network diagram illustrating a media gateway controller including an arbitrage detector and an internal number portability database according to an embodiment of the present invention.

FIG. 13 illustrates an alternate implementation of an arbitrage detection and system of the present invention, which is deployed in a packet switched communications network environment. In FIG. 13 a packet network 500 includes a media gateway controller (MGC) or soft switch 502, a tandem switching office 402 owned by Service Provider B, an IVR node 416, an end switching office 418 owned by Service Provider A, a called party 450, a first media gateway (MG) 504, a second MG 506, and a packet network 508. MGC node 502 sends and receives control signals to MG nodes 504 and 506 using a media gateway control protocol, such as MGCP or MEGACO. MG node 504 and 506 provide an interface between circuit-switched time division multiplexed (TDM) communications and packet switched communications in the network. MGC node 502 also supports SS7 signaling as well as other call setup signaling protocols (e.g., SIP, H.323, IETF SIGTRAN SS7-over-IP, etc.).

In FIG. 13, an arbitrage detector/processor 320 and a number portability database 321 are co-located with or accessible by MGC 502 in a manner similar to that described above with respect to the SG routing node 300. Arbitrage detector/processor 320 associated with MGC 502 includes a call release function, a call redirect function, a call pass function, and message accounting and reporting function as described above with regard to FIG. 7. IVR node 416 may be used in conjunction with MGC 502, in a manner similar to that previously described with respect to SG routing node 300, to request and collect calling party information prior to call setup completion. As described above, NP database 321 may be used to obtain jurisdiction information associated with an attempted call.

As the fundamental signaling message flows and message processing operations are nearly identical between the MGC embodiment and the SG routing node embodiment, a detailed discussion of these flows and operations is not repeated herein for the MGC embodiment. The present invention may be practiced in a similar manner at both network routing nodes, such as signaling gateways or signal transfer points, and MGC or soft switch nodes.

External Monitoring System Embodiment

Figure 14:
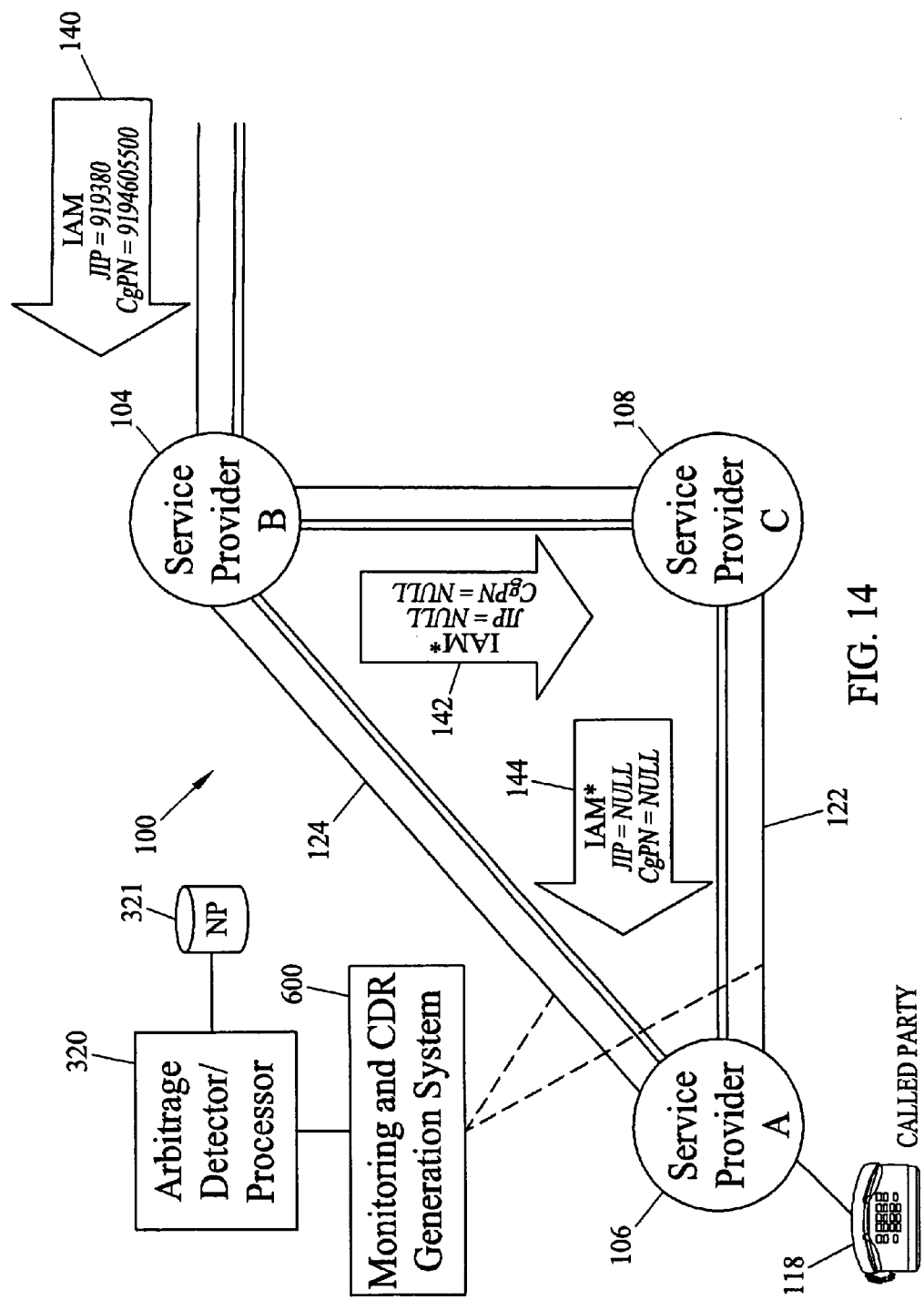
FIG. 14 is a network diagram illustrating an arbitrage detector and a number portability database associated with a network monitoring system according to an embodiment of the present invention.

In an alternate implementation of the present invention, arbitrage detection and processing operations may be performed by a stand-alone signaling network monitoring system that generates call detail records (CDRS) and copies of call setup signaling messages to an arbitrage detection and processing application. FIG. 14 illustrates an arbitrage detector/processor 320 configured to operate with a stand-alone network monitoring system. In FIG. 14, a signaling message monitoring system 600 copies signaling messages from signaling links 122 and 124. Monitoring system 600 correlates copied signaling messages and produces CDRs for each observed call or call attempt. Arbitrage detector/processor 320 is coupled to network monitoring system 300 via a communications link, such as an IP communications link. Arbitrage detector/processor 602 may also be coupled to a number portability database 321 to obtain jurisdictional information when that information is omitted from a signaling message, as described above.

In operation, network monitoring system 600 copies signaling messages and generates CDRs based on the signaling messages. Network monitoring system 600 may forward the CDRs and/or the signaling message copies to arbitrage detector/processor 320. Arbitrage detector/processor 320 screens the signaling messages to identify calls where arbitrage has occurred. In response to detecting that arbitrage has occurred, arbitrage detector/processor 320 may generate reports to identify to the service provider that arbitrage is occurring in their network or perform any of thither arbitrage mitigation actions described above. The system illustrated in FIG. 14 is particularly advantageous because it can be deployed in an existing network without modification to current network elements.

Thus, the present invention includes improved methods and systems for detecting call routing arbitrage and performing mitigating actions once the arbitrage is identified. For example, an arbitrage detector/processor according to the present invention may analyze signaling messages to determine whether one or more parameters in the signaling messages indicate the presence of call routing arbitrage. In response to determining that one of the parameters in the signaling messages indicates the presence of call routing arbitrage, the arbitrage detector/processor 320 may perform an arbitrage mitigation action, such as dropping the call notifying the calling party, or obtaining the missing originating party information and completing the call using the missing originating party information. Because arbitrage can be detected and a mitigating action can be performed by a single network entity, the present invention provides an effective way to reduce telecommunications service provider revenue loss due to call routing arbitrage.

It will be understood that various details of the invention may be changed without departing from the scope of the invention. Furthermore, the foregoing description is for the purpose of illustration only, and not for the purpose of limitation—the invention being defined by the claims.

What is claimed is:

1. A method for detecting and mitigating call routing arbitrage, the method comprising:
    (a) receiving a plurality of signaling messages relating to calls in a telecommunications network;
    (b) identifying, from the plurality of signaling messages, signaling messages that are candidates for call routing arbitrage screening, wherein call routing arbitrage includes misrouting calls to avoid tariffs;
    (c) from the signaling messages identified as candidates for call routing arbitrage screening, examining at least one parameter in the signaling messages to determine the presence of call routing arbitrage; and
    (d) in response to identifying the presence of call routing arbitrage, performing an arbitrage mitigation action.

2. The method of claim 1 wherein receiving signaling messages includes receiving SS7 signaling messages and wherein identifying messages as candidates for call routing arbitrage screening includes identifying ISUP IAM messages.

3. The method of claim 1 wherein receiving signaling messages includes receiving SS7 signaling messages encapsulated in IP datagrams and wherein identifying signaling messages as candidates for call routing arbitrage screening includes Identifying SUP IAM messages from the IP-encapsulated SS7 messages.

4. The method of claim 1 wherein receiving signaling messages includes receiving packet telephony signaling messages and wherein identifying signaling messages as candidates for call routing arbitrage screening includes identifying signaling messages used to initiate a packet telephony call or session.

5. The method of claim 1 wherein examining at least one parameter in each of the candidate signaling messages includes examining a calling party identification parameter in each of the signaling messages.

6. The method of claim 1 wherein examining at least one parameter in each of the signaling messages includes examining a jurisdiction informational parameter in each of the signaling messages.

7. The method of claim 1 wherein identifying the presence of call routing arbitrage includes identifying the presence of call routing arbitrage in response to the parameter being set to any value that is outside of a list of recognized values.

8. The method of claim 1 wherein identifying the presence of calf routing arbitrage includes identifying the presence of call routing arbitrage in response to the parameter being set to a predetermined value.

9. The method of claim 8 wherein the predetermined value is customizable by a network operator.

10. The method of claim 1 wherein identifying the presence of call routing arbitrage includes identifying signaling messages that are intended to make long-distance calls appear to a terminating carrier as local calls by routing the calls through local trunk groups of an intermediate carrier.

11. The method of claim 1 wherein performing an arbitration mitigation action includes dropping a call for which call routing arbitrage has been Identified.

12. The method of claim 1 wherein performing an arbitrage mitigation action includes redirecting a call for which call routing arbitrage has been identified to an interactive voice response server.

13. The method of claim 12 comprising, at the IVR server, requesting information missing from a call signaling message, and in response to receiving the information, reconstructing the call signaling message, and completing the call using the reconstructed call signaling message.

14. The method of claim 12 comprising, at the IVR server, requesting information missing from a call signaling message and in response to failing to receive the requested information, dropping the call.

15. The method of claim 1 wherein performing an arbitration mitigation action includes obtaining jurisdictional information from a number portability database and using the received jurisdictional information to fill in missing jurisdictional information from a call signaling message for which call routing arbitrage has been identified.

16. The method of claim 1 wherein steps (a)–(d) are performed at a signal transfer point.

17. The method of claim 1 wherein steps (a)–(d) are performed at an SS7/IP gateway.

18. The method of claim 1 wherein steps (a)–(d) are performed at a media gateway controller.

19. The method of claim 1 wherein steps (a)–(d) are performed by a stand-alone network monitoring system.

20. A system for identifying and mitigating call routing arbitrage, the system comprising:
    (a) an arbitrage pre-screening function for receiving signaling messages and for identifying signaling messages as candidates for arbitrage screening, wherein arbitrage includes misrouting calls to avoid tariffs;
    (b) an arbitrage screening function operatively associated with the arbitrage pre-screening function for receiving the signaling messages identified as candidates for arbitrage screening and for screening the signaling messages based on one or more parameters in the signaling messages to identify the presence of call routing arbitrage; and (c) an arbitrage mitigation function operatively associated with the arbitrage screening function for performing an arbitrage mitigation action to mitigate the call muting arbitrage.

21. The system of claim 20 wherein the arbitrage pre-screening function is adapted to identify the signaling messages as candidates for arbitrage screening based on the message type.

22. The system of claim 21 wherein the arbitrage pre-screening function is adapted to identify ISUP IAM messages as candidates for arbitrage screening.

23. The system of claim 21 wherein the arbitrage pre-screening function is adapted to identify packet telephony initial call setup messages as candidates for arbitrage screening.

24. The system of claim 20 wherein the arbitrage screening function is adapted to examine a calling party parameter in each signaling message to identify the presence of arbitrage call routing.

25. The system of claim 24 wherein the arbitrage screening function is adapted to identify the presence of call routing arbitrage in response to the calling party parameter being set to a predetermined value.

26. The system of claim 25 wherein the predetermined parameter is configurable by a network operator.

27. The system of claim 24 wherein the arbitrage screening function is adapted to identify the presence of call muting arbitrage in response to the calling party parameter being set to any value outside of a predetermined list of recognized values.

28. The system of claim 20 wherein the arbitrage screening function is adapted to identify the presence of call routing arbitrage based on jurisdictional information in each candidate signaling message.

29. The system of claim 28 wherein the arbitrage screening function is adapted to determine the presence of call muting arbitrage in response to the jurisdictional information being set to a predetermined value.

30. The system of claim 29 wherein the predetermine value is configurable by a network operator seeking to detect call routing arbitrage.

31. The system of claim 28 wherein the arbitrage screening function is adapted to identify the presence of call routing arbitrage based on the jurisdictional information being equal to any value that is outside a predetermined list of recognized values.

32. The system of claim 20 wherein the arbitrage screening function is adapted to Identify the presence of call routing arbitrage based on a circuit identification code (CIC) in each candidate signaling message.

33. The system of claim 32 wherein the arbitrage screening function is adapted to determine the presence of call routing arbitrage in response to the CIC being set to a predetermined value.

34. The system of claim 33 wherein the predetermine value is configurable by a network operator seeking to detect call routing arbitrage.

35. The system of claim 32 wherein the arbitrage screening function is adapted to identify the presence of call routing arbitrage based on the CIC being equal to any value that is outside a predetermined list of recognized values.

36. The system of claim 20 wherein the arbitrage mitigation function is adapted to drop each call for which call routing arbitrage is identified.

37. The system of claim 20 wherein the arbitrage mitigation function is adapted to redirect each call for which call routing arbitrage is identified to an interactive voice response (IVR) server.

38. The system of claim 37 wherein the IVR server is adapted to obtain information missing from call signaling messages associated with calls for which call routing arbitrage has been detected, to insert the missing information in the call signaling messages, and to complete the calls using the modified call signaling messages.

39. The system of claim 20 wherein the arbitrage pre-screening function, the arbitrage screening function, and the arbitrage mitigation function are components of an SS7 signal transfer point.

40. The system of claim 20 wherein the arbitrage pre-screening function, the arbitrage screening function, and the arbitrage mitigation function are components of an SS7/IP gateway.

41. The system of claim 20 wherein the arbitrage pre-screening function, the arbitrage screening function, and the arbitrage mitigation function are components of a media gateway controller.

42. The system of claim 20 wherein the arbitrage pre-screening function, the arbitrage screening function, and the arbitrage mitigation function are components of a stand-alone network monitoring system.

43. The system of claim 20 wherein the executed arbitrage prescreening function by a first processor and the arbitrage screening and mitigation functions are executed by a second processor separate from the first processor.

44. The system of claim 20 wherein the arbitrage mitigation function is configurable by the network operator.

45. The system of claim 44 wherein the arbitrage mitigation function is configurable to perform a first arbitrage mitigation action in response to detection of call routing arbitrage by a first party and to perform a second arbitrage mitigation function in response to call routing arbitrage by a second party.

* * * * *